(12) United States Patent
Feider et al.

(10) Patent No.: US 8,312,903 B2
(45) Date of Patent: Nov. 20, 2012

(54) TRUCK TIRE

(75) Inventors: Georges Gaston Feider, Bettborn (LU); Jean-Francois Cazin-Bourguignon, Audun-le-Tiche (FR); Pascal Patrick Steiner, Diekirch (LU); Jobst Meyer-Adlung, Ingeldorf (LU); Marek Grzegorz Wojcik, Bissen (LU); Phuoc Thuan Le, Attert (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 616 days.

(21) Appl. No.: 12/206,811

(22) Filed: Sep. 9, 2008

(65) Prior Publication Data

US 2009/0090444 A1 Apr. 9, 2009

Related U.S. Application Data

(60) Provisional application No. 60/977,148, filed on Oct. 3, 2007.

(51) Int. Cl.
*B60C 11/00* (2006.01)
*B60C 11/03* (2006.01)
*B60C 11/12* (2006.01)

(52) U.S. Cl. .............. 152/209.1; 152/209.8; 152/209.18

(58) Field of Classification Search ............... 152/209.1, 152/209.8, 209.9, 209.18
See application file for complete search history.

(56) References Cited

U.S. PATENT DOCUMENTS

| | | | | |
|---|---|---|---|---|
| 5,345,988 | A | | 9/1994 | Kabe et al. .................... 152/209 |
| 5,622,575 | A | | 4/1997 | Meyer-Adlung et al. ..... 152/209 |
| 5,665,184 | A | | 9/1997 | Fukumoto ................. 152/209 R |
| 5,803,999 | A | * | 9/1998 | Shibata .................... 152/209.14 |
| 2006/0005904 | A1 | | 1/2006 | Helt et al. .................. 152/154.2 |

FOREIGN PATENT DOCUMENTS

| | | | |
|---|---|---|---|
| EP | 408941 | * | 1/1991 |
| EP | 578216 | * | 1/1994 |
| EP | 1674293 | * | 6/2006 |
| JP | 61-9315 | * | 1/1986 |
| JP | 10 226207 | | 9/1994 |
| JP | 2002-219909 | * | 8/2002 |
| JP | 2007-168628 | * | 7/2007 |
| JP | 2007-283822 | * | 11/2007 |
| KR | 2005097197 | * | 10/2005 |
| KR | 2006060325 | * | 6/2006 |
| WO | WO 2008/096498 | * | 8/2008 |

OTHER PUBLICATIONS

European Search Report, completed Dec. 4, 2008.
Patent Abstracts of Japan, Publication No. 10226207 dated Aug. 25, 1998.

* cited by examiner

*Primary Examiner* — Justin Fischer
(74) *Attorney, Agent, or Firm* — June E. Rickey (57) ABSTRACT

A pneumatic tire for use on trucks, the tire comprising: a tread, the tread having a non-skid depth (NSK), the tread including a first and second shoulder rib and two or more inner ribs, and circumferential grooves interposed between the ribs. The tread pattern is asymmetric, wherein the first shoulder rib has a rib width ratio in the range of about 1.2 to about 1.8, and the second shoulder rib has a rib width ratio in the range of about 1.0-1.6.

13 Claims, 10 Drawing Sheets

TRUCK TIRE

This application claims the benefit of, and incorporates by reference, U.S. Provisional Application No. 60/977,148 filed Oct. 3, 2007.

FIELD OF THE INVENTION

The invention relates in general to pneumatic tires for vehicles such as trucks, and more particularly, for steer axle tires for trucks.

BACKGROUND OF THE INVENTION

Steer axle tires for use on trucks typically endure cornering and turning loads as well as straight line running loads. The tread design for these types of tires typically has a plurality of ribs. Typically, the tread design has been symmetric about the longitudinal center plane of the tire.

Problems relating to all tires and more particularly, to steer axle tires is the rate at which the tire wears, the rolling resistance and wet skid performance. Tire designers are always seeking ways to achieve a higher removal mileage through a slower wear rate, along with an improvement in wet skid performance as well as a reduction in rolling resistance.

DEFINITIONS

"Aspect Ratio" means the ratio of a tire's section height to its section width.

"Axial" and "axially" mean the lines or directions that are parallel to the axis of rotation of the tire.

"Bead" or "Bead Core" mean generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers.

"Block element" means a tread element defined by a circumferential groove or shoulder and a pair of laterally extending grooves.

"Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the side edges of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 650 and 900 with respect to the equatorial plane of the tire.

"Rib" means a circumferentially extending strip of rubber of the tread which is defined by at least one circumferential groove and either a second circumferential groove or a lateral edge, wherein the strip is not divided by full depth grooves.

"Radial Ply Tire" means a belted or circumferentially-restricted pneumatic tire in which the ply cords which extend from bead to bead are laid at cord angles between 650 and 900 with respect to the equatorial plane of the tire.

"Side edge" means a portion of a tire between the tread and the bead.

"Sipe" means small slots or elongated void areas typically formed by thin steel blades, and which tend to remain closed, and function to increase traction.

"Laminate structure" means an unvulcanized structure made of one or more layers of tire or elastomer components such as the innerliner, side edges, and optional ply layer.

BRIEF DESCRIPTION OF THE DRAWINGS

The invention will be described by way of example and with reference to the accompanying drawings in which.

DETAILED DESCRIPTION OF THE INVENTION

FIGS. 1-4 illustrate a first embodiment of a pneumatic tire, suitable for use as a truck tire, and particularly suitable for use on steering axles. The tire 10 has a tread 12 with a non-skid depth D. The tread 12 is designed to achieve a higher removal mileage through a slower wear rate, along with an improvement in wet skid performance as well as a reduction in rolling resistance, as described in more detail, below.

The tire tread may have a high net to gross ratio in the range of about 70 to about 90, more preferably in the range of about 74 to about 86 and most preferably about 84. The ratio of the tire maximum section width to the tread width may be greater than, about equal to or slightly less than 1. As shown, the maximum section width is about 1.2.

Figure 4:
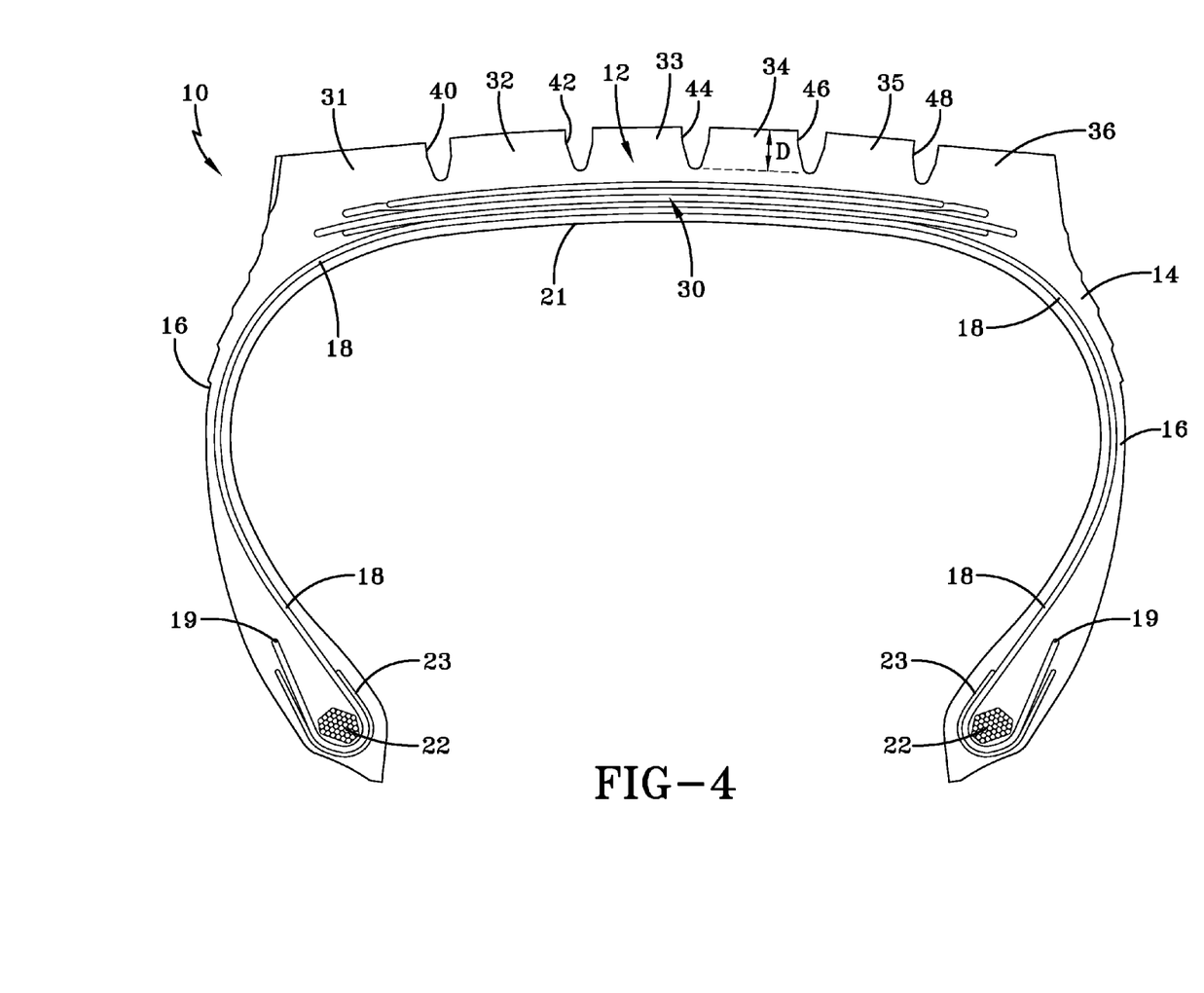
FIG. 4 is a cross-sectional view of the tire.

The tire 10 further comprises a casing 14 which includes two side edges 16 which extend down from the tread 12. The tire casing 14 further includes one or more radial plies 18 extending from and preferably wrapped about or otherwise secured to two annular beads 20. In the embodiment illustrated and not limited to same, there is only one ply 18 and it is wrapped around the bead in an inside out manner such that the ply ending 19 is located axially outward of the bead. The beads 20 may be any desired shape, but in this embodiment it is shown as a hexagonal configuration with steel filaments.

The tire may further optionally include an apex (not shown). The ply turnup in the bead area may be optionally reinforced with a chipper 23 wrapped about the bead ply 18.

The tire 10 further includes a belt reinforcement structure 30 which is located between the tread and the one or more plies 18. The belt reinforcing structure may be comprised of one or more layers of reinforcement. The ply 18 and the belt reinforcing structure 30 are made from cord reinforced elastomeric material, wherein the cords are typically steel wire or polyamide filaments and the elastomer preferably being rubber.

The tire 10 further comprises a liner 21 which is typically formed of halobutyl rubber which forms an air impervious barrier.

The tire may further include flippers, chippers, apexes (not shown) and other tire components not mentioned herein.

Figure 5:
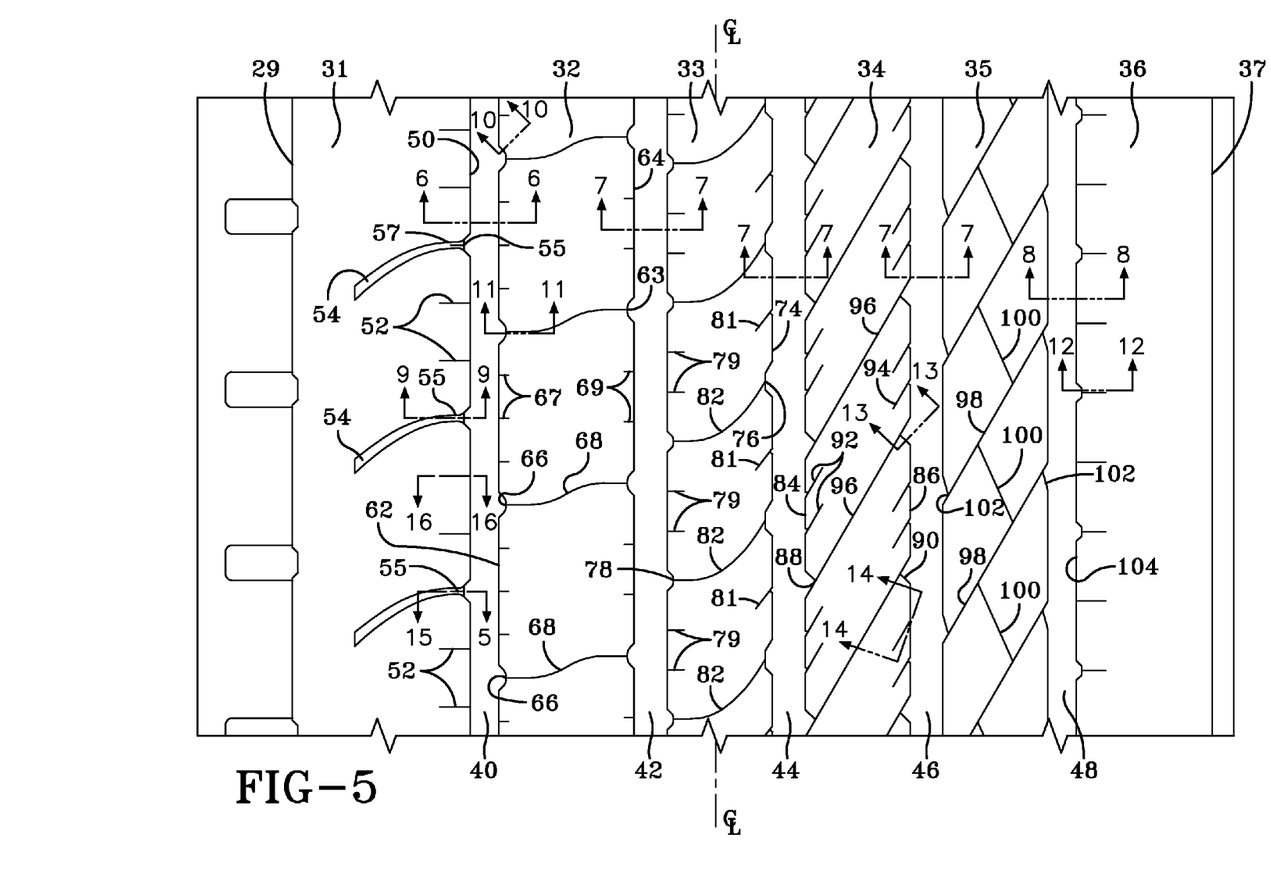
FIG. 5 is an enlarged view of the tire tread of FIG. 3.

The tire tread 12 as shown in FIG. 5, is asymmetric, which means that the tire tread is not symmetrical about the tire center line or longitudinal axis. In a preferred embodiment, the tire may be oriented on a vehicle such that a first side 29 is mounted on the outside of the vehicle, and a second side 27 is mounted on the inside of the vehicle. The tire tread 12 has a plurality of circumferentially continuous ribs, which may vary, but preferably comprises four to seven, and most preferably six, ribs 31, 32, 33, 34, 35 and 36. The ribs 31-36 are designed so that there are wide, sturdy ribs on the outside and narrower ribs on the inside. The tread 12 comprises an outer shoulder rib 31 and an inner shoulder rib 36. The width of the outer ribs is preferably greater than the inner ribs, and more preferably the shoulder rib 31 is the widest rib. It is additionally preferred that the outside shoulder rib 31 be wider than inside shoulder rib 36. In addition it is preferred for improved shoulder wear that the shoulder ribs 31, 36 be wider than inner ribs 32-35. In one example, the rib width ratios (rib#/rib 33) may comprise the following, from outside to inside:

| | Rib Number | | | | | |
|---|---|---|---|---|---|---|
| | 31 | 32 | 33 | 34 | 35 | 36 |
| Rib width ratio | About 1.2 to 1.8, preferably about 1.6-1.8, and most preferred about 1.7 | About 1.0 to 1.5, typically about 1.3 | About .9-1.1, typically about 1 | About .9-1.1, typically about 1 | About .9-1.5, typically about 1 | About 1.0 to 1.6, typically about 1.3 |

Positioned between each rib is a circumferential groove, preferably continuous. Thus in this particular embodiment, there are 5 grooves, from the outside of the tire 29 to the inside. The outermost grooves 40, 48 are not as wide as the inner grooves 42, 44, 46. In one example, the groove width ratios (groove#/groove 44) are as follows:

| | Groove # | | | | |
|---|---|---|---|---|---|
| | 40 | 42 | 44 | 46 | 48 |
| Width ratio | About .75 to 1.0, more preferably about .86 | 1.0 | 1.0 | 1.0 | About .75 to 1.0, more preferably about .86 |

Figure 6:
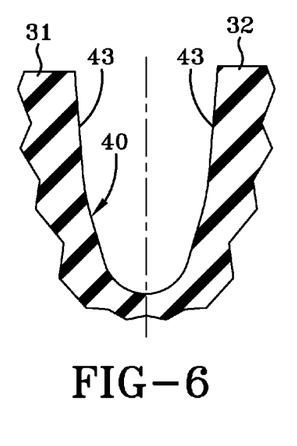
FIGS. 6-16 are cross-sectional views of the cylindrical grooves in the directions indicated in FIG. 5.
Figure 7:
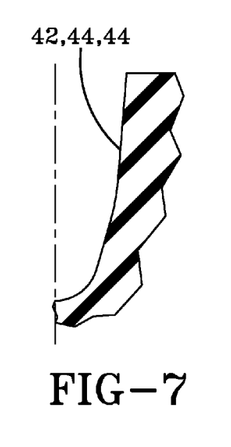
Figure 8:
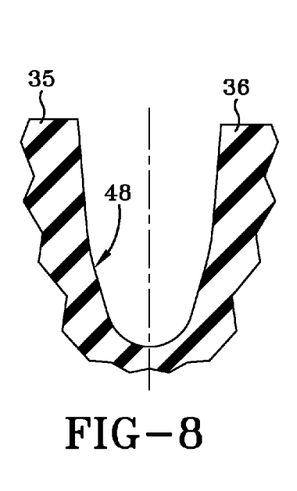

FIG. 6 illustrates the cross-sectional shape of groove 40, which has a full bottom radius, typically in the range of about 2 to 5 mm with nearly straight groove side edges 43 or slightly angled upper edges in the range of 2 to 6 degrees from the vertical plane. FIG. 7 illustrates the cross-sectional shape of grooves 42, 44, 46. Grooves 42, 44, 46 have a full bottom radius of 3 mm with angled upper edges of 2 to 6 degrees. FIG. 8 illustrates the cross-sectional shape of groove 48, wherein the groove has a full bottom radius of 3 mm with angled upper edges of 2 degrees. Groove 48 has an optional stepped tread surface wherein tread element on one side 35 has radially outer surface than the tread element surface 36 on the other side. Groove 40 also has an optional stepped tread surface wherein tread element on the axially inner element 32 is slightly radially outward than the axially outer tread elements 31.

The tire tread 12 is designed to have a stiffness gradient that varies from one side to the other. Preferably, the stiffness gradient is higher on the outside 29 than the inside 27. One optional way this may be achieved is by varying the rib widths, as described above. A second optional way the stiffness gradient may be varied is by varying the pitch of the tread elements in the ribs. The rib width variation may be utilized alone, or in combination with the pitch variation. In order to achieve a higher stiffness gradient on the outside 29, a smaller number of pitches is utilized on the outside ribs, for example, ribs 31,32,33 than as compared to the ribs on the inside 34,35,36. In one example, the tread elements of ribs 31 and 32 have a lower (10 to 35%) number of pitches as compared to the other ribs. Preferably ribs 31 and 32 have the same pitch spacing. Tread elements of ribs 33, 34, 35 and 36 may also have a relatively higher number of pitches in the range of 10-35% than the tread elements of ribs 31, 32. Preferably all of ribs 33-36 have the same pitch spacing, although not required. It is preferred to utilize a smaller number of pitches on the two axially outer ribs 31, 32 than the inner ribs 33-35, so that there is a stiffness gradient from the outside to the inside, wherein the outside has a higher stiffness than the inside.

Figure 1:
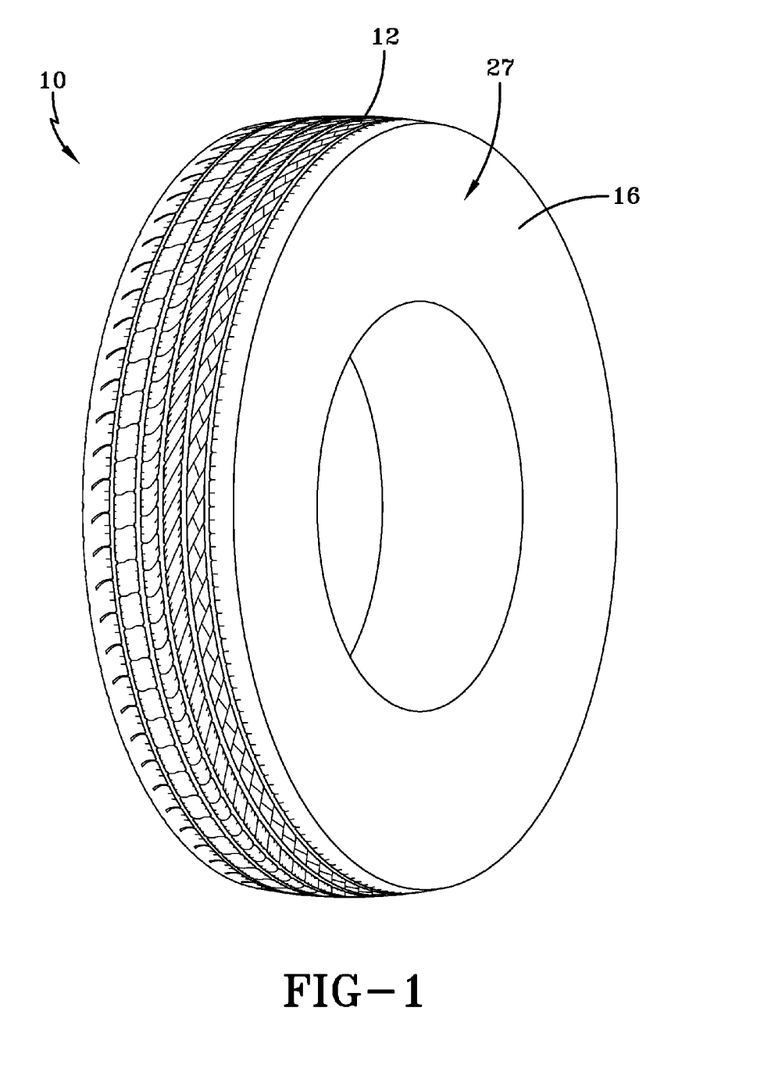
FIG. 1 is a perspective view of a first embodiment of a tire of the present invention.
Figure 2:
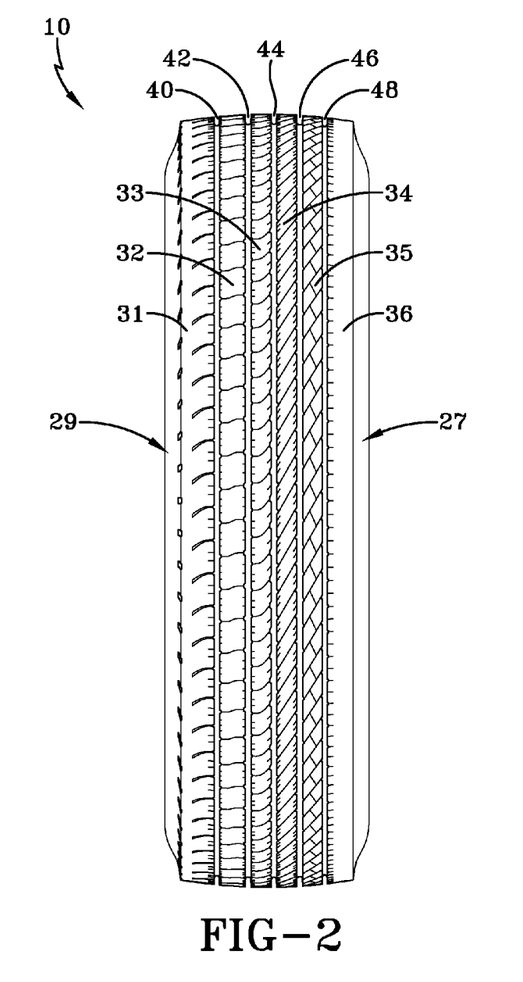
FIG. 2 is a front view of the tire of FIG. 1.
Figure 3:
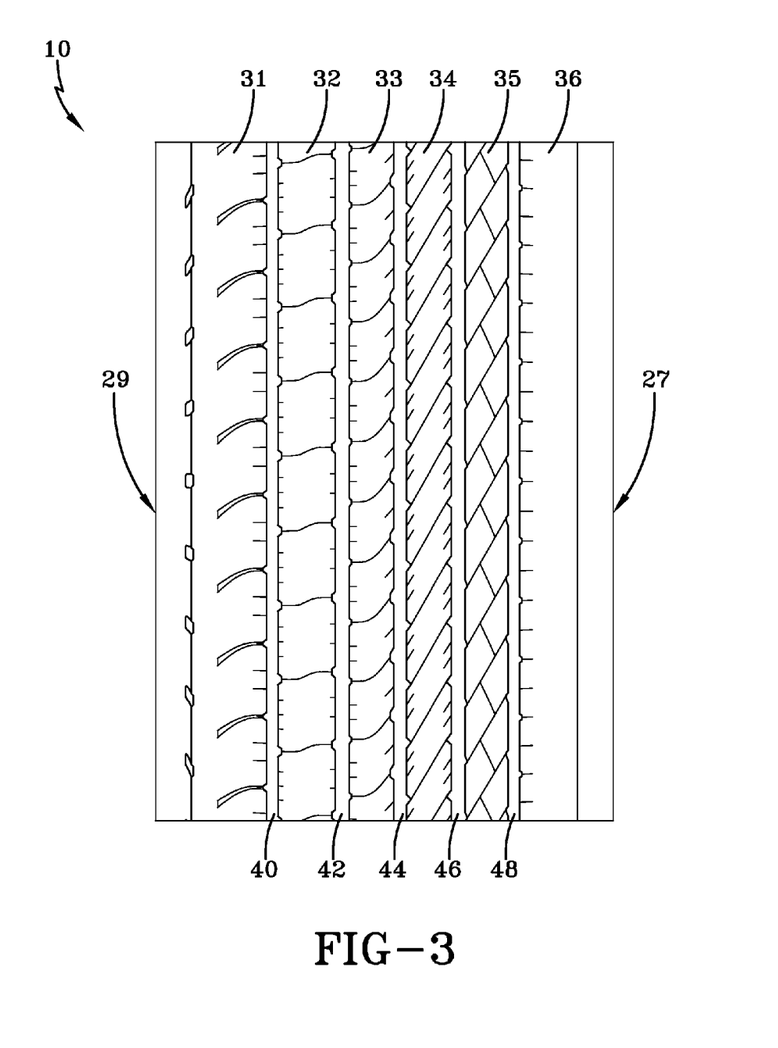
FIG. 3 is a close up front view of the tire tread of FIG. 2.

A third optional way to vary the stiffness gradient across the tread is to vary the blade angle of the sipes. As shown in FIGS. 3 and 5, each rib 31-36 has sipes. The ribs 31-36 are siped in such away to provide a third way to increase the stiffness gradient of the tire, with the highest gradient on the axially outer side 29 and the lowest gradient on the axially inner side 27. As described in more detail, below, each rib has siping of various depths and lengths, but a higher blade density is utilized on the axially inner ribs 27. On the inside riding rib 34 and the axially inner edge 74 of rib 33, the sipes are angled at an increased angle relative to the axial direction as compared to the sipe angle on the other ribs 31-32, 35-36, so to reduce stiffness and increase blade density towards the inside 27.

Figure 9:
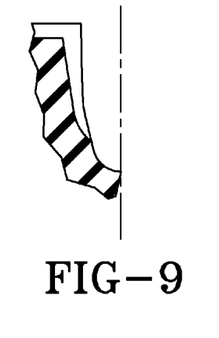
Figure 10:
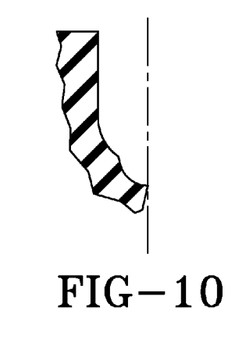
Figure 16:
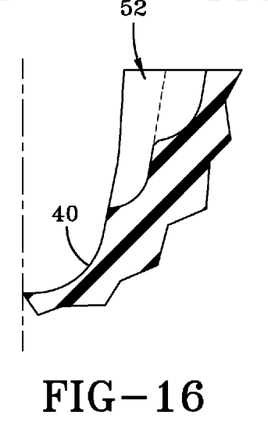

Rib 31 has axially outer lateral edge and bounded by circumferentially continuous groove 40. In this particular embodiment, it is preferred but not required that the edges 50 of rib 31 are substantially straight in the circumferential direction. Alternatively, the edges 50 may be zigzagged or nonlinear. Rib 31 has a comparatively large axial width siping on its axially inner edge 50. Sipes 52 have a depth of 30 to 90% of NSK, preferably 50 to 80%, and are preferably oriented substantially in the axial direction. FIG. 16 illustrates the sipe cross-sectional view. Preferably, sipes 52 are two dimensional in shape as shown, although other shapes would work for the invention. The rib 31 further comprises a partial groove 54 which is optional. As shown in FIG. 5, the groove 54 is angled with respect to axial direction, typically about 30 degrees and does not fully extend across the rib. Grooves 54 are shallow, and have a U shape, about 1.5 mm in depth. The rib 31 further comprises chamfers 55 at the intersection of the groove opening 54 and the edge 50. At the intersection of the groove opening 54 and the edge 50, there is a sipe 57, of which a cross-sectional view is shown in FIG. 9. Sipe 57 has a depth H of 30 to 90% of NSK, preferably 50 to 80%.

Figure 11:
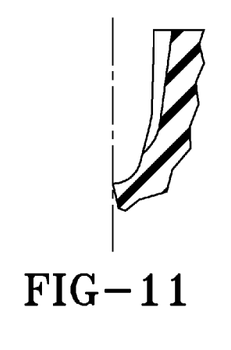
Figure 12:
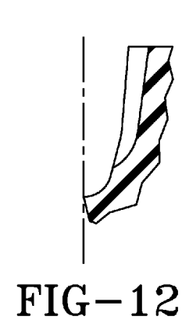
Figure 13:
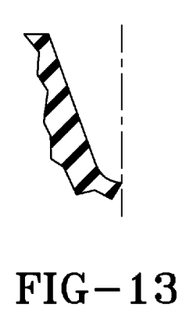
Figure 14:
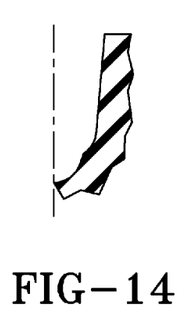

Rib 32 has lateral edges 62, 64 formed by circumferentially continuous grooves 40, 42. Edges 62, 64 are preferably substantially straight although could be zigzagged or otherwise nonlinear in the circumferential direction with rounded element ends 66, 63. The chamfered element ends 66, 63 preferably are axially offset from each other. Rib 32 has a plurality of full sipes 68 which extend completely across the axial width of the rib 32 joining the rounded ends 66, 63, in an axial direction. Sipes 68 have a full depth of about 50% NSK, but may range from 50% to 80%. Sipes 68 divide the rib into tread elements, which are staggered or axially offset from the other tread elements of the other ribs to reduce noise and promote even wear. Rib 32 further comprises sipes 67 and 69 which are substantially axial in direction. The axially outer edge 62 of rib 32 has more sipes 67 than the axially inner edge 64. The cross-sectional shape of sipes 67 are shown in FIG. 11 and the cross-sectional shapes of sipes 69 are shown in FIG. 9, although the shape may vary to achieve desired blade area.

Figure 15:
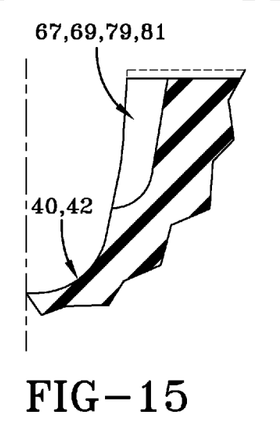

Rib 33 is the middle rib if six ribs are used, and in this particular embodiment, the rib centerline is not centered on the centerplane of the tire. However, the tire centerline passes through rib 33 in this particular embodiment. Rib 33 has two opposed edges 72, 74 which are preferably substantially straight in the circumferential direction (although could be zigzagged or otherwise nonlinear) with chamfered elements 76, 78. Axially outer edge 72 has preferably substantially axially oriented sipes 79 which have a cross-sectional shape as shown in FIG. 15. Axially inner edge 74 has preferably less sipe density than edge 72. Edge 74 has one sipe 81 per tread element, and is oriented at increased angle relative to axial direction, in the range of about 20-60 degrees, more typically about 30-50 degrees. Sipe cross-section 81 is shown in FIG. 15. Rib 33 also has sipe 82 which divides the rib into tread elements, and which extends across the rib from edge 72 to edge 74. Sipe 82 has a 75% NSK which may vary from 50-90% NSK. Sipe 82 is oriented at a higher angle than sipe 68, typically in the range of about 15-75 degrees, and has an increased depth compared thereto.

Inner Rib 34 has two opposed edges 84, 86 which are preferably substantially straight in the circumferential direction (although could be zigzagged or otherwise nonlinear) with chamfered elements 88, 90. Each edge 84, 86 have sipes 92, 94 oriented at a high angle, in the range of about 50-75 degrees with respect to axial direction. Rib 34 is divided into tread elements by sipe 96 which extends completely across the rib from edge 84 to edge 86, and is angled in the range of about 60-80 degrees. Sipe 96 has a depth of about 75% NSK but may range from about 50-90%.

Rib 35 is similar to rib 34, except that rib 35 preferably has no edge sipes. Rib 35 has full sipe 98 which extends from edge to edge at a high angle (relative to axial direction) in the range of about 50-80 degrees. Sipes 98 divide the rib 35 into tread elements, which are staggered in the circumferential direction with respect to the other tread elements of the other ribs. Sipe 98 has a depth of about 80% NSK although it may range from 50-90%. Rib 35 further comprises sipe 100 which may intersect adjacent sipes 98, 98'. Sipe 100 is oriented primarily in the circumferential direction. Sipe 100 has a NSK depth of about 70% NSK, although it may range from 50-80% NSK. Rib 35 further comprises chamfered ends 102 at the junction of the tread elements to minimize stress concentrations.

Outer rib 36 is similar to rib 31, although it is preferably axially narrower. Rib 36 has an axially outer edge 104 with a plurality of axially oriented sipes 106, having a depth of 50 to 90% preferably about 80% NSK.

Figure 17:
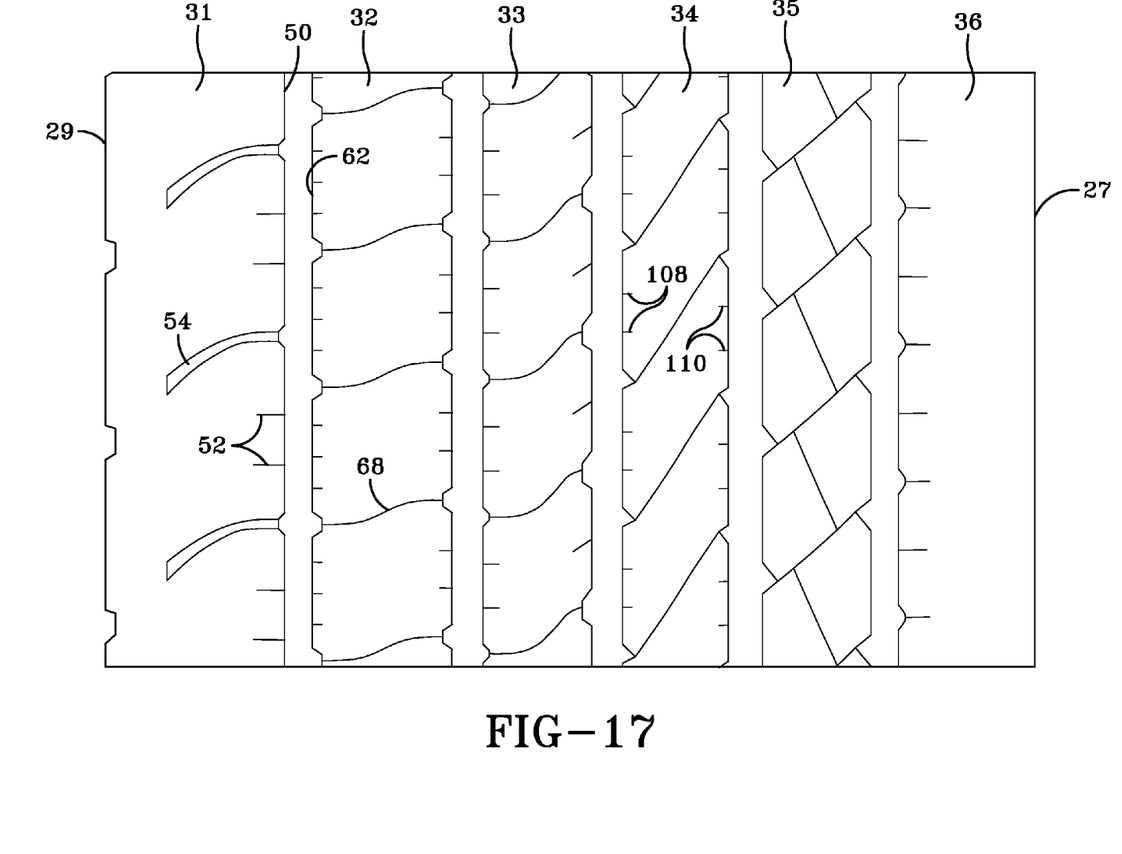
FIG. 17 is a front view of a second embodiment of a tread profile of the present invention.
Figure 18:
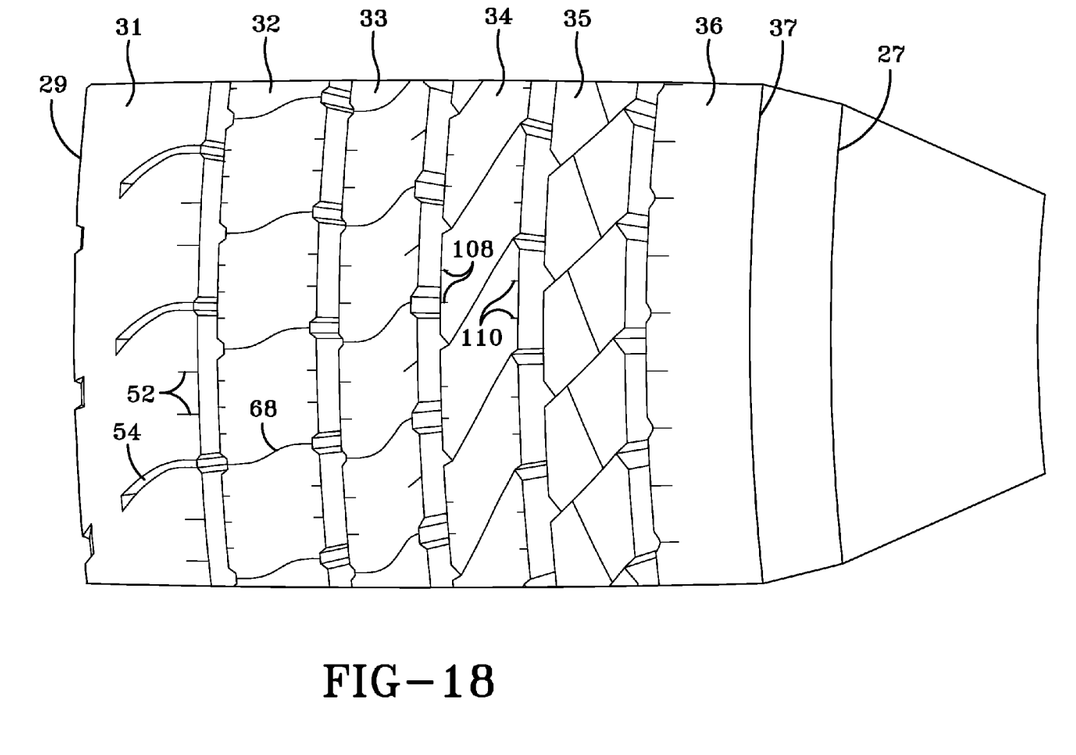
FIG. 18 is a side perspective view of the tread profile taken from the right hand side of FIG. 17.
Figure 19:
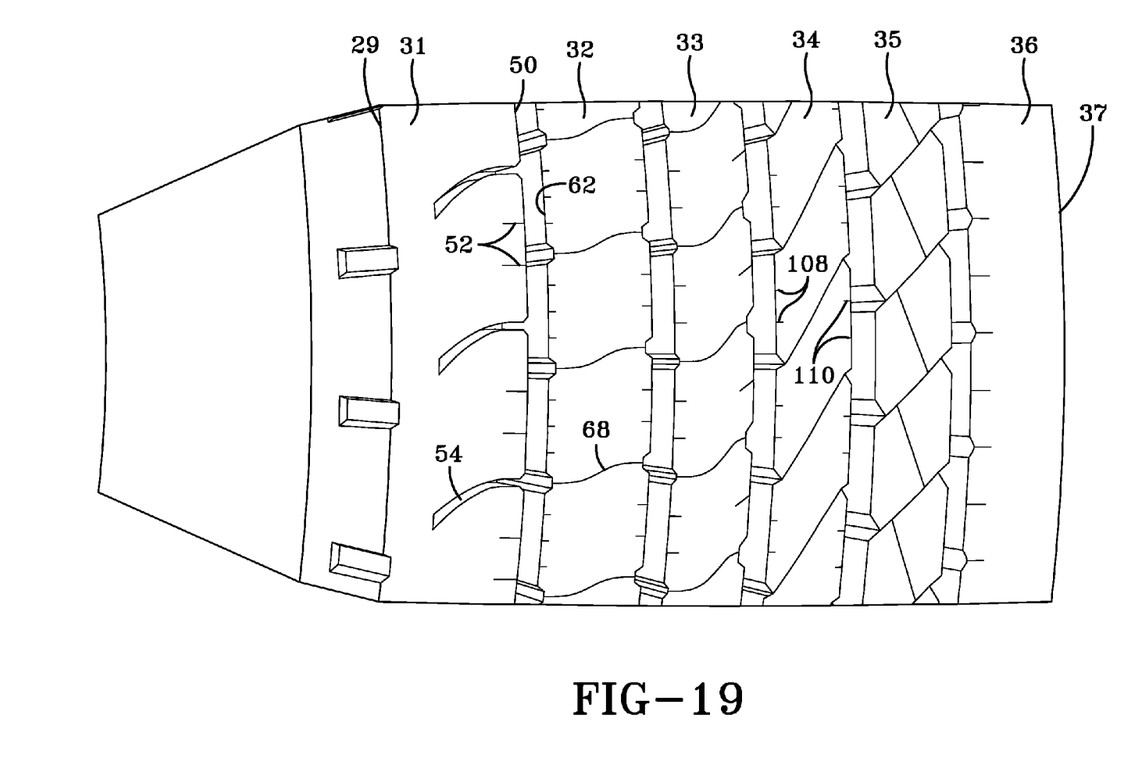
FIG. 19 is a side perspective view of the tread profile taken from the left hand side of FIG. 17.

FIG. 17 illustrates a second embodiment of the invention, with all the tire elements described above being the same, except for the following differences. Rib 34 has sipes 108,100 which are substantially oriented in the axial direction for the parts of the sipes that touch the edges 84 and 86.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire for use on trucks, the tire comprising: a tread, the tread having a non-skid depth (NSK), the tread including an inner and outer shoulder rib and a first, second, third and fourth inner rib, and circumferential grooves interposed between the ribs, wherein the tread is asymmetric, wherein the outer shoulder rib has a rib width/second inner rib width ratio in the range of about 1.2 to about 1.8, and the inner shoulder rib has a rib width/second inner rib width ratio in the range of about 1.0-1.6, wherein the inner and outer shoulder ribs each have a plurality of tread blocks, and the inner ribs have a plurality of tread blocks, wherein the inner ribs each have more tread blocks than the outer shoulder rib, wherein all of the inner ribs have a lateral sipe which extends completely across the width of the rib and has a depth of at least 50% NSK, and an angle of an outer shoulder rib sipe is less than the angle of at least one of the inner rib lateral sipes.

2. The tire of claim 1 wherein the inner ribs have a rib width/second inner rib width ratio in the range of about 0.9 to 1.5.

3. The tire of claim 1 wherein the inner shoulder rib has a number of tread blocks in the range of 10-30% higher than the number of tread blocks of the outer shoulder rib.

4. The tire of claim 1 wherein the sipe angle of the outer shoulder rib is less than the lateral sipe angle of each of the axially inner ribs.

5. The tire of claim 1 wherein the stiffness gradient of the tread decreases from the outer shoulder rib to the inner shoulder rib.

6. The tire of claim 1 wherein each rib has edges, wherein the edges are circumferentially straight or zigzagged with a light to medium amplitude, wherein at least one rib has axially oriented sipes along the edges.

7. The tire of claim 6 wherein at least one rib has no sipes along the edge of the rib edge.

8. The tire of claim 1 wherein each rib has edges, wherein the edges are circumferentially straight or zigzagged with a light to medium amplitude, wherein at least one rib has angled sipes along the edges.

9. The tire of claim 1 wherein each rib has edges, wherein all but one of the ribs have siping in the edges.

10. The tire of claim 1 wherein the depth of the lateral sipe of each rib increases from one side of the tire to the other.

11. The tire of claim 1 wherein one of the lateral sipes has a s shaped curve.

12. The tire of claim 1 wherein one of the ribs has lateral sipes which are joined together by a second circumferentially oriented sipe.

13. The tire of claim 1 wherein the outer shoulder has the largest width of all the ribs.

* * * * *